United States Patent
Bianchi et al.

(10) Patent No.: US 10,195,782 B2
(45) Date of Patent: Feb. 5, 2019

(54) AIR FILLED GASKET

(71) Applicant: Unique Fabricating, Inc., Auburn Hills, MI (US)

(72) Inventors: Daniel Bianchi, Aurburn Hills, MI (US); Bradley J. Hazen, Rochester, MI (US)

(73) Assignee: UNIQUE FABRICATING INC, Auburn Hills, MI (US)

( * ) Notice: Subject to any disclaimer, the term of this patent is extended or adjusted under 35 U.S.C. 154(b) by 793 days.

(21) Appl. No.: 14/099,458

(22) Filed: Dec. 6, 2013

(65) Prior Publication Data

US 2015/0158236 A1 Jun. 11, 2015

(51) Int. Cl.

| B29C 51/16 | (2006.01) |
|---|---|
| B29C 47/00 | (2006.01) |
| B29C 65/00 | (2006.01) |
| B29C 67/20 | (2006.01) |
| B29C 43/02 | (2006.01) |

(Continued)

(52) U.S. Cl.
CPC ........... *B29C 51/006* (2013.01); *F16J 15/027* (2013.01); *F16J 15/46* (2013.01); *B29C 49/04* (2013.01); *B29C 49/22* (2013.01); *B29C 51/105* (2013.01); *B29C 65/02* (2013.01); *B29C 66/242* (2013.01); *B29C 66/71* (2013.01); *B29C 66/727* (2013.01); *B29K 2023/04* (2013.01); *B29K 2023/0691* (2013.01); *B29K 2023/10* (2013.01); *B29K 2105/04* (2013.01); *B29L 2031/265* (2013.01); *B32B 5/18* (2013.01); *B32B 27/065* (2013.01); *B32B 27/08* (2013.01); *B32B 27/32* (2013.01)

(58) Field of Classification Search
CPC .......... B29K 2105/046; B29K 2105/24; B29K 2023/0691; B29C 49/04; B29C 49/22; B29C 49/005; B29C 2791/006; B29C 65/02; B29C 66/71; B29C 66/727; B29C 66/242; B32B 27/065; B32B 27/08; B32B 27/32; B32B 5/18
USPC ..... 156/60, 77, 78, 156, 196, 212, 242, 245, 156/285, 286, 287, 292, 304.1, 304.2, 156/308.2, 308.4, 309.6; 428/35.7, 36.5; 264/321, 545, 553
See application file for complete search history.

(56) References Cited

U.S. PATENT DOCUMENTS 4,608,104 A * 8/1986 Holtrop ............... B32B 5/32
156/145
5,089,190 A 2/1992 Trevathan et al.
(Continued)

FOREIGN PATENT DOCUMENTS

DE 10313495 A1 * 10/2004 ......... B29C 37/0053
EP 445592 A2 * 9/1991

OTHER PUBLICATIONS

Chinese Office Action, Application No. 201410680090.3, dated Nov. 4, 2016, 7 pages.
(Continued)

*Primary Examiner* — Philip C Tucker
*Assistant Examiner* — Brian R Slawski
(74) *Attorney, Agent, or Firm* — Panagos Law Group PLLC; Bill C Panagos; Daniel Checkowsky

(57) ABSTRACT

A foam twin-sheet formed air filled gasket is provided. The foam sheets need not be covered with one or more layers of air impermeable materials before, during or after the twin-sheet forming process. Methods for manufacturing the air filled gaskets are also disclosed.

8 Claims, 3 Drawing Sheets

(51) Int. Cl.
*B29C 49/00* (2006.01)
*B29C 51/00* (2006.01)
*B29D 22/00* (2006.01)
*B29D 23/00* (2006.01)
*B29D 24/00* (2006.01)
*B29D 29/00* (2006.01)
*B32B 37/00* (2006.01)
*B32B 1/08* (2006.01)
*B65D 39/00* (2006.01)
*C08J 5/00* (2006.01)
*F16J 15/46* (2006.01)
*F16J 15/02* (2006.01)
*B29K 23/00* (2006.01)
*B29L 31/26* (2006.01)
*B29C 49/22* (2006.01)
*B29C 49/04* (2006.01)
*B32B 27/32* (2006.01)
*B32B 5/18* (2006.01)
*B32B 27/06* (2006.01)
*B32B 27/08* (2006.01)
*B29C 65/02* (2006.01)
*B29K 105/04* (2006.01)
*B29C 51/10* (2006.01)

(56) References Cited

U.S. PATENT DOCUMENTS

| | | | |
|---|---|---|---|
| 5,353,695 A | 10/1994 | Ledet | |
| 6,875,484 B1* | 4/2005 | Kogure | B29C 44/04 |
| | | | 264/45.1 |
| 7,375,291 B2 | 5/2008 | Ariel | |
| 2005/0077683 A1* | 4/2005 | Comert | B60R 13/06 |
| | | | 277/300 |
| 2010/0062198 A1* | 3/2010 | Ohmura | B29C 49/0047 |
| | | | 428/35.7 |
| 2012/0060960 A1* | 3/2012 | Sumi | B29C 47/0021 |
| | | | 138/141 |

OTHER PUBLICATIONS

Chinese Office Action Application No. 201410680090.3, Translation, 8 pages.

\* cited by examiner

AIR FILLED GASKET

TECHNICAL FIELD

The present disclosure relates to twin-sheet formed air filled gaskets, and methods of manufacturing the same.

BACKGROUND

Gaskets are used in many applications to form mechanical seals. In automotive applications, many gaskets are formed from one or more foam sheets. Such foam gaskets may bend into nooks and crannies in various irregularly shaped gaps and/or voids in any of a number of automotive structures.

Historically, foam gaskets in automotive applications are solid rather than hollow. "Solid" as used herein includes sheets of foam material, even though air is trapped in cell structures. For example, a sheet of foamed polyurethane is "solid." "Solid" foam sheets includes sheets of constant or substantially constant density, varying density, or combinations thereof. Air in cells of the foamed material is outside of the definition of "encapsulated air" or "air filled pocket" as used herein.

It is understood that use of solid foam sheets as gaskets can add to material cost and can add weight to a structure where additional weight may not be desired. Thus, gaskets having at least one hollow section may be useful.

Hollow gaskets of various materials have been formed by adhering one previously formed gasket portion to another previously formed gasket portion. This adhering processing has traditionally included manufacturing steps such as die cutting and/or fusion molding. Such additional manufacturing steps may add cost and time to the manufacture of gaskets having at least one hollow section.

Thus, there is a need for light-weight gaskets that use less material and that minimize the weight added to components. There is also a need to maintain relatively simple and/or streamlined manufacturing processes such as those that use existing equipment.

SUMMARY

The present application discloses an air filled foam gasket that may address one or more of the needs in the art. "Air filled" as used herein does not refer to the air entrapped in cells in foam; rather, "air filled" refers to pockets of air encapsulated between layers of foam. The air pockets may become encapsulated between layers of foam through a twin-sheet thermoforming process that gives the gasket its shape. "Air filled" can but does not necessarily require that the entirety of the gasket be filled with air; rather, it is contemplated that regions of gaskets may include one or more air filled pockets along with flat regions.

DETAILED DESCRIPTION

The present disclosure relates to unexpected phenomena. It had been understood that if an air filled pocket would formed between two foam sheets during a heat intensive process to give the pocket an initial shape, then subsequent cooling would result in collapse of one foam sheet onto the other. This collapse would be expected to substantially destroy the initially formed shape of the air filled pocket. This expectation was based, at least in part, on the Ideal Gas Law, the cellular/porous nature of foam materials, the absence of additional structural material in or around the foam sheets to maintain an initially formed shape, and/or the absence of additional layer(s) of air impermeable material on outer surfaces of the foam sheets and/or at a seam between the sheets.

Nevertheless, it was surprisingly discovered that twin-sheeting foam sheets together to form an air filled pocket in a gasket resulted in an air filled pocket in the two-layer foam gasket that substantially maintained its initial shape, even after cooling.

Figure 1:
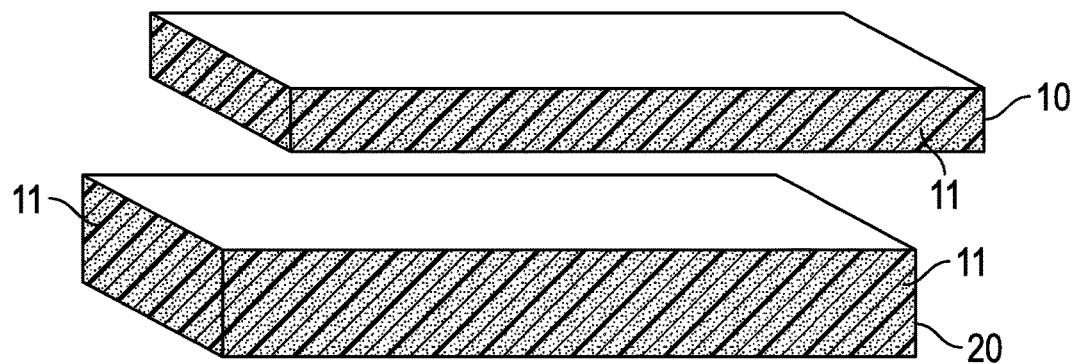
FIG. 1 is a perspective view of a foam sheets.

Referring to FIG. 1, foam sheets 10 and 20, each having a plurality of cells 11, are starting materials that ultimately become foam layers in an air filled gasket. Foam sheets 10 and 20 may be of the same or different foam materials and may have the same or different densities. Foam sheets 10 and 20 may be formed from closed cell foams. For example, one or both of foam sheets 10 and 20 may be a cross-linked polyolefin foam. Many materials may be suitable, including polypropylene foams, polyethylene foams, and blends thereof. It is contemplated that air impermeable layers of material need not be included on or added to outer surfaces of foam sheets 10 and 12. Selected materials may have densities across a number of ranges, including 2 lb/ft$^3$ to 4.31 lb/ft$^3$, although densities outside of this exemplary range are also contemplated.

Figure 2:
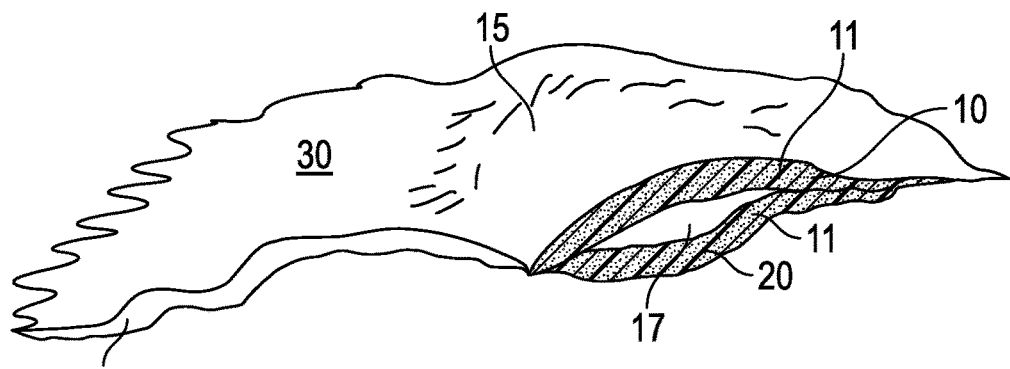
FIG. 2 is a cut-away perspective view of an exemplary gasket having an air filled pocket.

Referring to FIG. 2, a cut-away perspective view of an exemplary air filled foam gasket 30 is shown. Foam sheets 10 and 20, following exposure to a thermoforming process, became formed to a predetermined shape and are sealed at seal 22. The cut-away view shows foam sheet 10 and foam sheet 20 having an air filled pocket 17 therebetween, which is also viewable as raised region 15.

Figure 3:
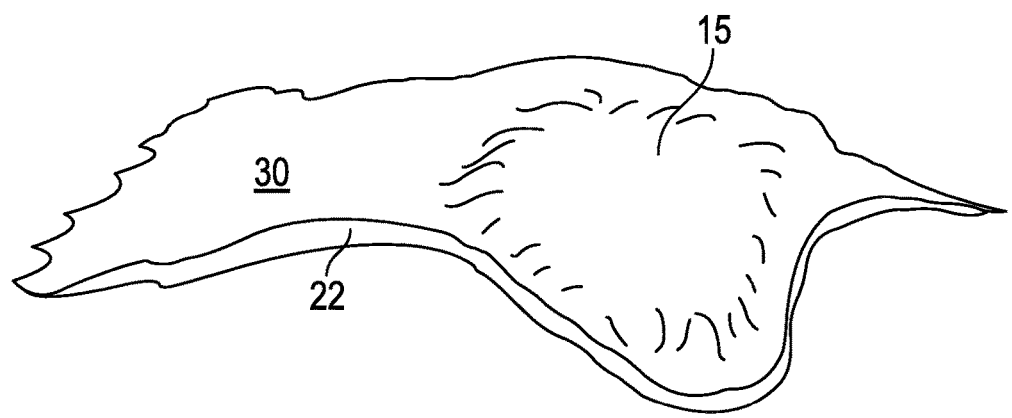
FIG. 3 is a perspective view of an exemplary gasket having an air filled pocket.

Referring to FIG. 3, a perspective view of exemplary air filled foam gasket 30 is shown. The air filled pocket 17 is not viewable except through the raised area 15. It is contemplated that the air filled pocket 17 is encapsulated along its periphery from a seal 22 formed during a thermoforming process such as twin sheeting. Additional seals formed from fusion molding and die cutting, as well as additional air impermeable materials may be added after formation of a shaped air filled foam gasket 30, but they are not necessary. Indeed, embodiments are specifically contemplated that have an absence of additional air impermeable materials. Moreover embodiments are specifically contemplated that have an absence of fusion molded seals or other types of seals beyond those formed during the thermoforming process.

Figure 4:
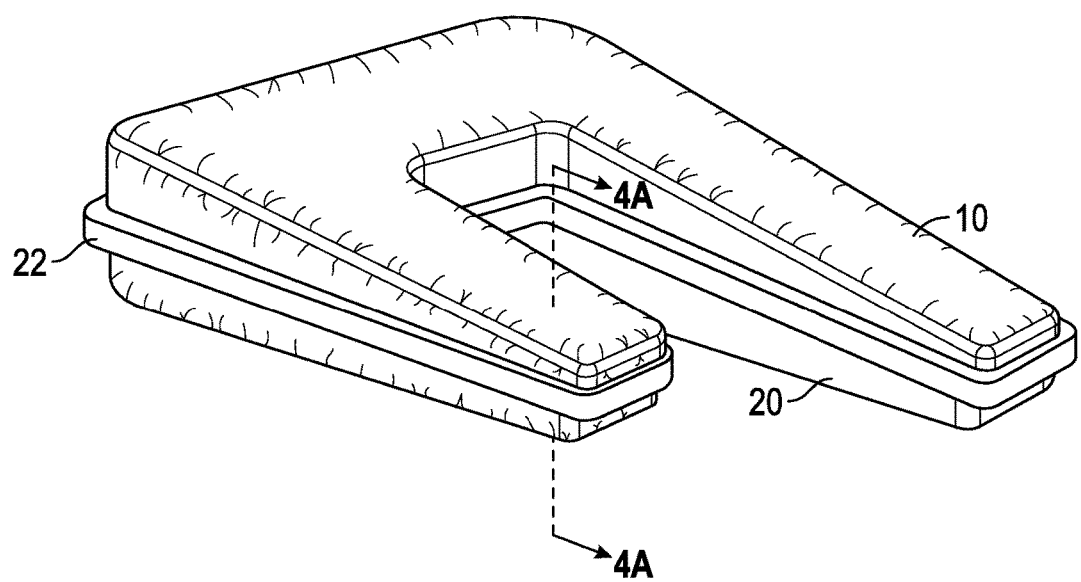
FIG. 4 is a perspective view of another exemplary gasket having an air filled pocket.
Figure 4A:
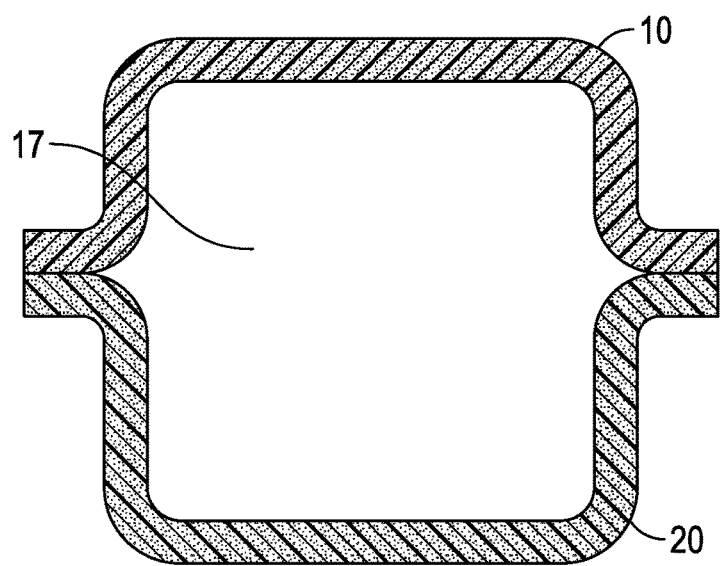
FIG. 4A is a cut-away view of the exemplary gasket of FIG. 4.

Referring to FIG. 4, another exemplary air filled gasket is shown. The exemplary gasket is formed from foam sheets 10 and 20. The exemplary gasket has a seal 22 at the joint between foam sheets 10 and 20. The exemplary gasket has an air filled pocket 17, as been seen in the cut-away view provided by FIG. 4A.

Figure 5:
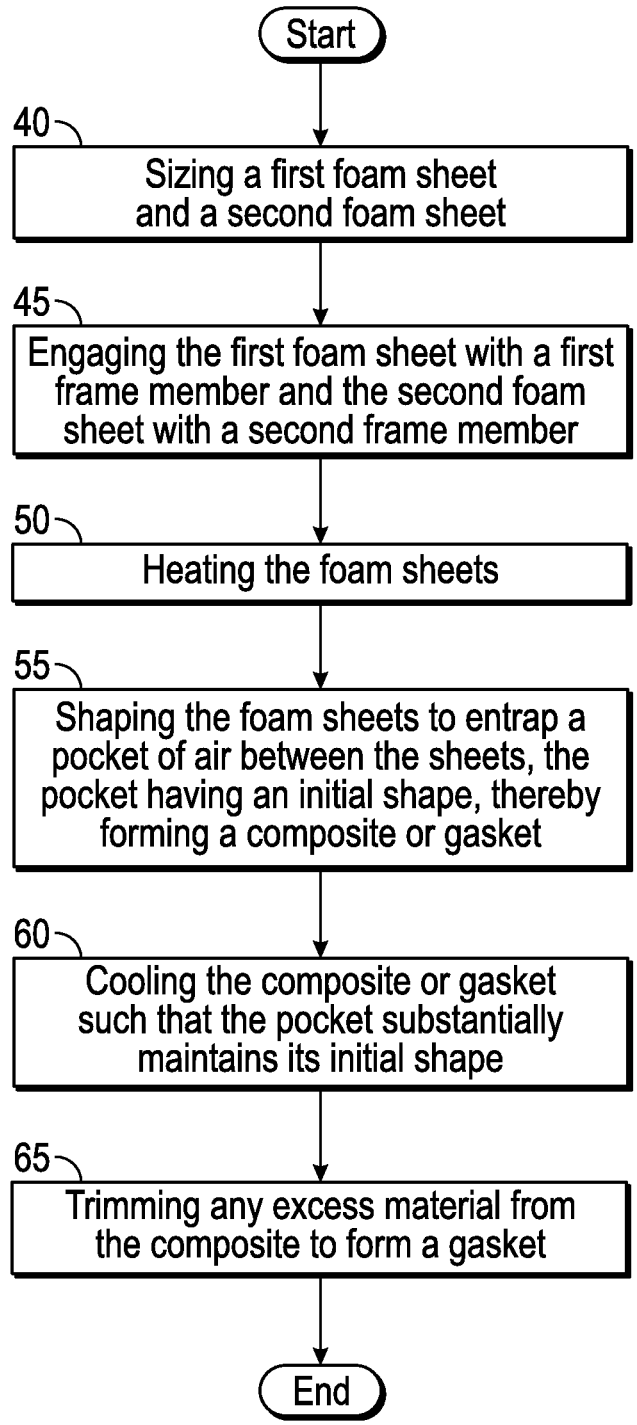
FIG. 5 is an exemplary method of manufacturing an air filled foam gasket.

Referring to FIG. 5, an exemplary thermoforming manufacturing method is disclosed; namely, twin sheeting. In operation, the first foam sheet 10 and the second foam sheet 20 are properly sized, see block 40. These sheets ultimately become the foam layers in air filled gasket 30. This may require the first foam sheet 10 and the second foam sheet 20 to be cut or trimmed to a specific length and/or width. The size of the first foam sheet 10 and the second foam sheet 20 may be determined by the size and shape of the void that will be filled with the gasket 30. In certain applications, the size of the first foam sheet 10 and the second foam sheet 20 may also be determined by the size of a press used in twin sheeting and the dimensions of the upper mold tool and the lower mold tool which correspond to the design of the air filled foam gasket 30 being formed.

Before a composite that leads to gasket 30 is formed, the first foam sheet 10 is engaged with a first frame and the second foam sheet 20 is engaged with a second frame on a twin sheeting apparatus, see block 45. The foam sheets 10 and 20 may be engaged or removably secured with the frames using hydraulically operated mechanical clamps or any other suitable mechanisms for holding the foam sheets in place during a heating operation. By clamping the foam sheets to the frames, the foam sheets may also be kept in tension during the heating operation.

The first foam sheet 10 and the first frame may be introduced into the heating operation. The process may occur in an oven or any structure capable of heating the first foam sheet 10 to a predetermined temperature for a specific period of time. The second foam sheet 20 and the second frame may be introduced into the heating process at the same time as the first foam sheet 10 or in close proximity to the first foam sheet 10, see block 50. The second foam sheet 20 and second frame may be introduced into the same oven or heating structure as the first foam sheet 10 or the second foam sheet 20 and second frame may be introduced into an alternate oven or heating structure.

The temperature and time period for the heating process are dependent on the density and the thickness of the foam sheets being used to form the gasket. In one example, the first foam sheet 10 and the second foam sheet 20 may be heated to a temperature in the range of about 280 degrees F. to 360 degrees F. More specifically, the first foam sheet 10 and the second foam sheet 20 may be heated to a temperature of about 300 degrees F. When the first foam sheet 10 and the second foam sheet 20 are heated within this temperature range, the sheets may contemporaneously or subsequently (while warm or hot) be molded into the shape of the desired gasket 30 using a press, an upper mold tool, and a lower mold tool, see block 55. This process leaves an air filled pocket having an initial shape between first foam layer and second foam layer that together form a composite or a gasket 30.

The forming process may include the upper tool mold and the lower tool mold. The upper tool mold and the lower tool mold used in the forming process are selected based on the design of the void for a vehicle that will be filled with a gasket 30.

In one exemplary operation, the first foam sheet 10 may be positioned adjacent to an interior surface of the upper tool mold and the second foam sheet 20 may be positioned adjacent to an interior surface of the lower tool mold. The upper tool mold and the lower tool mold may include channels or any other suitable structures capable of removing air. Accordingly, a vacuum pump or any other suitable device may be applied to the upper tool mold causing the first foam sheet to take the form of the interior surface of the upper tool mold. This may create a first section of the composite or gasket 30. Similarly, a vacuum pump or any other suitable device may be applied to the lower tool mold causing the second foam sheet to take the form of the interior surface of the lower tool mold. This may create a second section of the composite or gasket 30.

The upper tool mold and the lower tool mold may then be compressed together. The effect of the heated sheets and the pressure from the compression bonds the first section of the composite or gasket and the second section of the composite or gasket forming a unified composite or gasket.

The composite or gasket may be cooled, see block 60. Many cooling methods are contemplated, including simply removing the gasket from the twin sheet apparatus and allowing the gasket to cool at room temperature in the indoor manufacturing environment until the gasket itself reaches equilibrium. Other cooling methods may be possible, such as the use of refrigeration or fans to quicken cooling, or methods to slow down cooling. If necessary, any existing excess material may be trimmed off of a composite to form a gasket 30, see block 65. If not necessary, the composite is itself the gasket 30.

Surprisingly, cooled gaskets substantially maintain the initial shape of the air filled pocket rather than collapsing. Here, "substantially" the same shape means a final shape might not be identical to the initial shape, but the final shape causes the foam gasket to be functionally operable due in part to the dimensions of the air filled pocket in the gasket.

With regard to the processes, systems, methods, etc. described herein, it should be understood that, although the steps of such processes, etc. have been described as occurring according to a certain ordered sequence, such processes could be practiced with the described steps performed in an order other than the order described herein. It further should be understood that certain steps could be performed simultaneously, that other steps could be added, or that certain steps described herein could be omitted. In other words, the descriptions of processes herein are provided for the purpose of illustrating certain embodiments, and should in no way be construed so as to limit the claimed invention.

Accordingly, it is to be understood that the above description is intended to be illustrative and not restrictive. Many embodiments and applications other than the examples provided would be apparent upon reading the above description. The scope of the invention should be determined, not with reference to the above description, but should instead be determined with reference to the appended claims, along with the full scope of equivalents to which such claims are entitled. It is anticipated and intended that future developments will occur in the technologies discussed herein, and that the disclosed systems and methods will be incorporated into such future embodiments. In sum, it should be understood that the invention is capable of modification and variation.

All terms used in the claims are intended to be given their broadest reasonable constructions and their ordinary meanings as understood by those knowledgeable in the technologies described herein unless an explicit indication to the contrary is made herein. In particular, use of the singular articles such as "a," "the," "said," etc. should be read to recite one or more of the indicated elements unless a claim recites an explicit limitation to the contrary.

What is claimed as new and desired to be protected by Letters Patent of the United States is:

1. A method of manufacturing an air filled foam gasket, comprising:

removably securing a first thermoformable cross-linked foam sheet in a first frame;

removably securing a second thermoformable cross-linked foam sheet in a second frame;

heating said first thermoformable cross-linked foam sheet and said second thermoformable cross-linked foam sheet in a tool mold; said tool mold including an upper mold tool and a lower mold tool, said upper mold tool having an upper mold tool interior form, said lower mold tool having a lower mold tool interior form, and at least one of said upper and lower mold tool interior forms conforming to a gap;

introducing a vacuum to said tool mold to conform the heated first thermoformable cross-linked foam sheet to said upper mold tool interior form, and the second thermoformable cross-linked foam sheet to the lower mold tool interior form;

thermoforming the first cross-linked foam sheet to the second cross-linked foam sheet and encapsulating ambient air in said gap between the first and the second cross-linked foam sheets to form a gasket having an air filled pocket therebetween with an initial shape formed during thermoforming; and cooling the gasket following thermoforming such that the air filled pocket substantially maintains the initial shape.

2. The method of claim 1, wherein thermoforming comprises twin sheet processing.

3. The method of claim 1, wherein the first cross-linked foam sheet comprises the same material as the second cross-linked foam sheet.

4. The method of claim 1, wherein the first cross-linked foam sheet comprises a different material from the second cross-linked foam sheet.

5. The method of claim 1, wherein at least one of the first cross-linked foam sheet or the second cross-linked foam sheet comprises a closed cell cross-linked polyolefin foam.

6. The method of claim 1, wherein at least one of the first cross-linked foam sheet and the second cross-linked foam sheet comprises a sheet selected from the group consisting of polypropylene, polyethylene, and blends thereof.

7. The method of claim 1, wherein cooling comprises allowing the gasket to cool from temperatures used during thermoforming to room temperatures without fans or refrigeration.

8. The method of claim 1, wherein cooling comprises removing the gasket from thermoforming equipment and exposing the gasket to a temperature and a pressure of an indoor manufacturing environment for at least about one hour.

\* \* \* \* \*